Aug. 14, 1962 ISAMU FUKUOKA 3,049,175
COMBINATION VENETIAN BLIND TILTER-LIFTER DEVICE
Filed Sept. 14, 1959 7 Sheets-Sheet 1

INVENTOR.
ISAMU FUKUOKA
BY Samuel J. Stoce
ATTORNEY.

Aug. 14, 1962 ISAMU FUKUOKA 3,049,175

COMBINATION VENETIAN BLIND TILTER-LIFTER DEVICE

Filed Sept. 14, 1959 7 Sheets-Sheet 2

INVENTOR.
ISAMU FUKUOKA
BY Samuel J Stoll
ATTORNEY.

INVENTOR.
ISAMU FUKUOKA
BY Samuel J Stoll
ATTORNEY.

Aug. 14, 1962 ISAMU FUKUOKA 3,049,175

COMBINATION VENETIAN BLIND TILTER-LIFTER DEVICE

Filed Sept. 14, 1959 7 Sheets-Sheet 4

INVENTOR.
ISAMU FUKUOKA

BY Samuel J Stree

ATTORNEY.

Aug. 14, 1962 ISAMU FUKUOKA 3,049,175
COMBINATION VENETIAN BLIND TILTER-LIFTER DEVICE
Filed Sept. 14, 1959 7 Sheets-Sheet 5
FIG. 9.
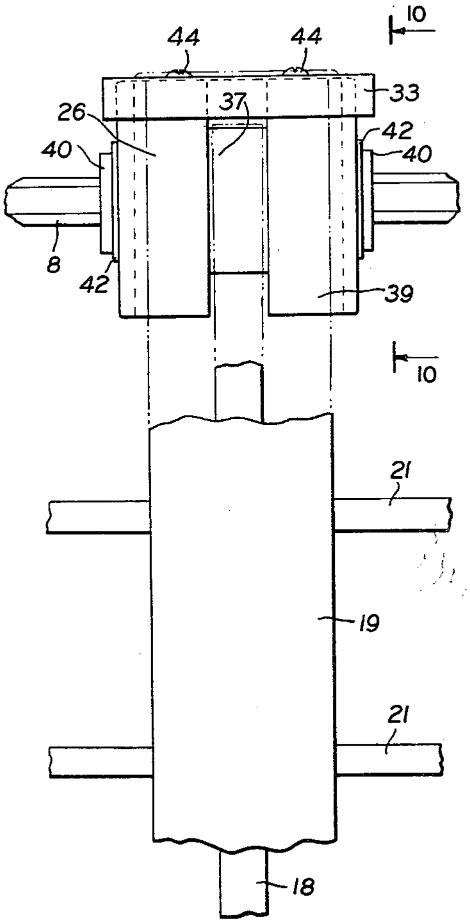
FIG. 10.
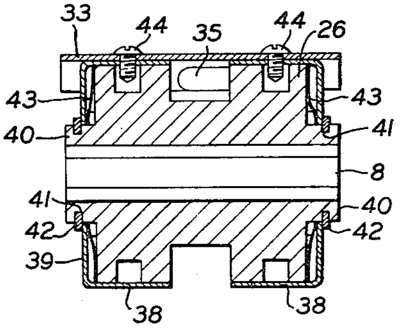
FIG. 11.
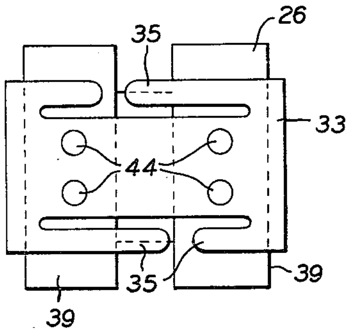
FIG. 12.
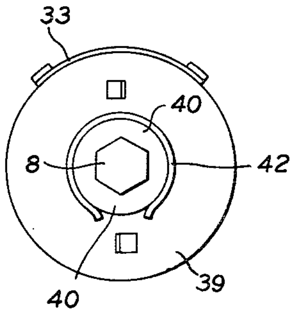
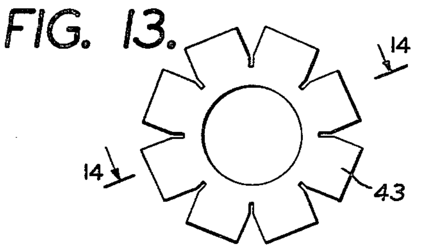
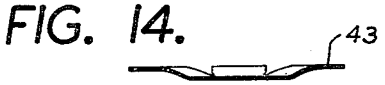
INVENTOR.
ISAMU FUKUOKA
BY Samuel Stree
ATTORNEY.

COMBINATION VENETIAN BLIND TILTER-LIFTER DEVICE

Filed Sept. 14, 1959 7 Sheets-Sheet 6

INVENTOR.
ISAMU FUKUOKA
BY Samuel [signature]
ATTORNEY.

INVENTOR.
ISAMU FUKUOKA
BY
ATTORNEY.

United States Patent Office 3,049,175

Patented Aug. 14, 1962

3,049,175

COMBINATION VENETIAN BLIND TILTER-LIFTER DEVICE

Isamu Fukuoka, Kamakura, Kanagawa-ken, Japan, assignor to Nichibei Blind Mfg. Co., Ltd., Tokyo, Japan Filed Sept. 14, 1959, Ser. No. 839,891
3 Claims. (Cl. 160—177)

The present invention relates to a device which both tilts and lifts Venetian blinds from the same actuation source.

In the past Venetian blinds required one set of actuation means to obtain the desired slat tilt and a second set of actuation means for raising and lowering the slats. These separate actuation means were usually spaced at opposite ends of the blinds. The double placement of tilter and lifter often, in the case of long Venetian blinds, required two separate actions to completely set a Venetian blind.

According to the present invention a mechanism is provided which from one actuation source both tilts and raises or lowers a Venetian blind.

The object of the present invention is to provide a simple device for raising, lowering and tilting a Venetian blind from one actuation source.

Other objects and advantages of this invention, residing in the novel features of construction, arrangement and combination of parts, will become more apparent from the description of the specific embodiments hereinafter following. It will be understood that certain features of the invention may be utilized other than in the entire arrangement disclosed.

The invention, however, is not intended to be restricted to any particular construction or product, or any particular arrangement of parts, or any particular application of such construction or arrangement of parts, or any specific method of operation, or any of various details thereof, even where specifically shown and described herein, as the same may be modified in various particulars, or may be applied in many varied relations, without departing from the spirit and scope of the claimed invention, practical constructions embodying certain details of the invention being illustrated and described, but only for the purpose of complying with the requirements of the statutes for the disclosure of operative embodiments, but without attempting to disclose all of the various forms and modifications in which the invention might be embodied.

Although such novel features as are believed to be characteristic in the invention are pointed out in the claims, the invention itself, as to its objects and advantages and the manner in which they may be carried out, may be better understood by reference to the description following and the accompanying drawings.

FIGURE 9 shows a front elevation of a further embodiment of the tilter-lifter of the present invention.

FIGURE 10 shows a cross section of FIGURE 9 at line 10—10.

FIGURE 11 shows a plan view of the tilter-lifter shown in FIGURE 9.

FIGURE 12 shows a side elevation of the tilter-lifter shown in FIGURE 9.

FIGURE 13 shows a front elevation of the spring shown in FIGURE 10.

FIGURE 14 shows a cross section of the spring of FIGURE 13 at line 14—14.

Referring now to the figures in greater detail, where like reference numbers denote like parts in the various figures.

Figure 1:
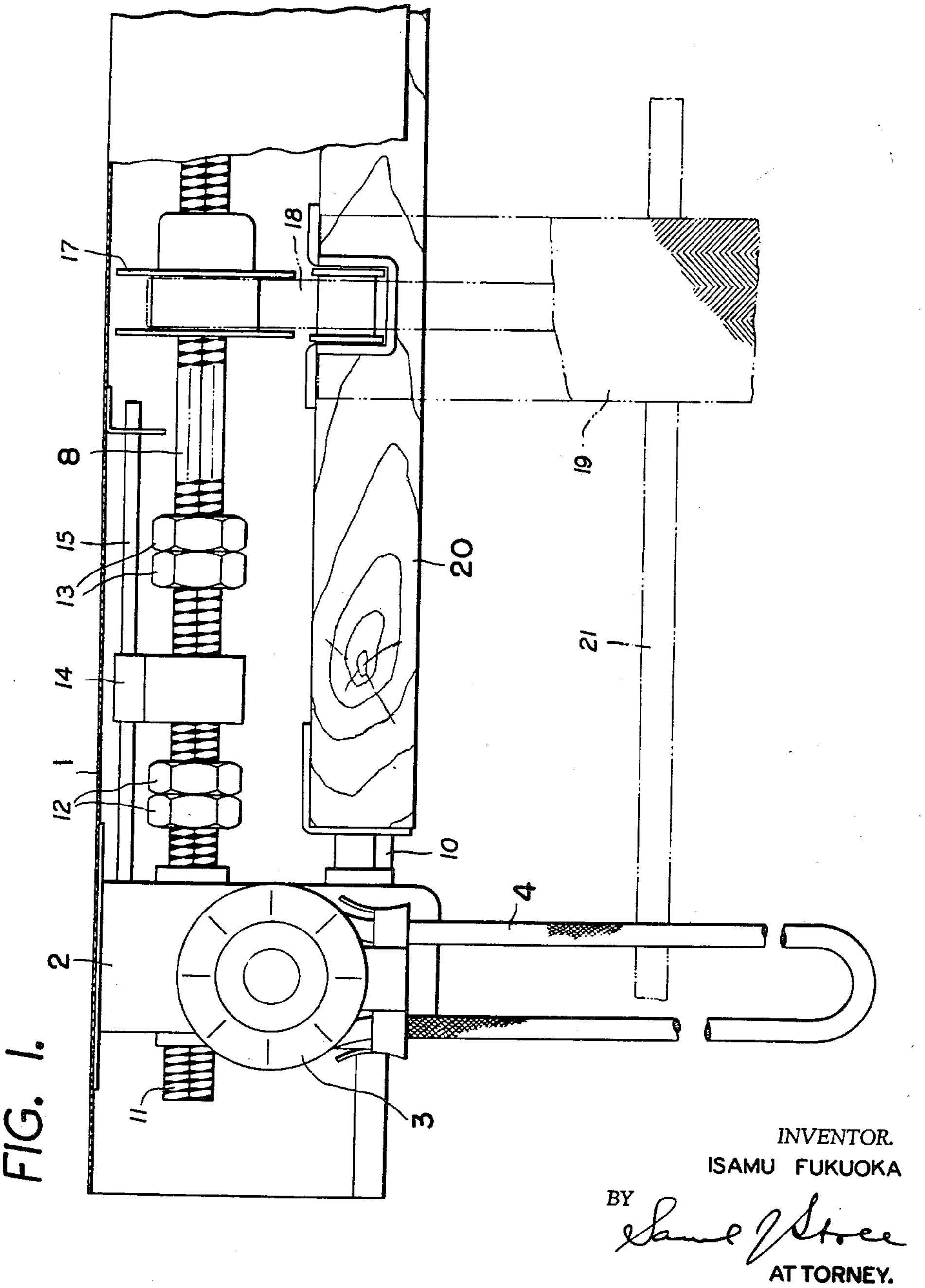
FIGURE 1 shows a front elevation of a Venetian blind head box with the front panel cut away showing a tilter-lifter device of the present invention.

A tilter-lifter of the present invention is shown in a cutaway head box 1. The tilter-lifter is enclosed in a housing 2 outside of which is set an operating drum 3 actuated by an operating cord 4 (FIGURE 1).

Figure 2:
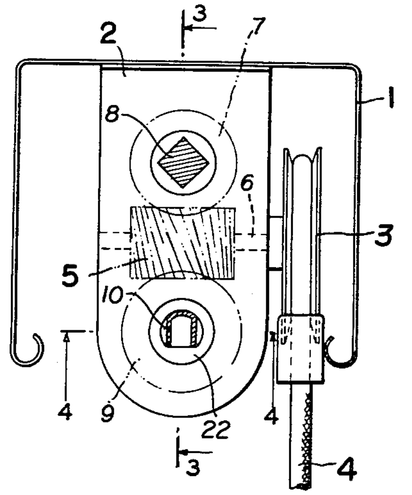
FIGURE 2 shows a side elevation of the tilter-lifter device shown in FIGURE 1.
Figure 3:
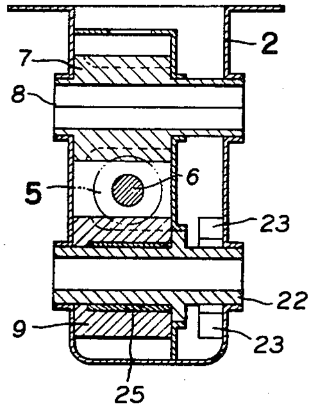
FIGURE 3 shows a cross section of the tilter-lifter device shown in FIGURE 2 at line 3—3.

A worm gear 5 attached to a shaft 6 is connected to the operating drum 3 and is meshed with the worm upper gear 7 through which is attached the lifter shaft 8 (FIGURES 2 and 3).

Figure 4:
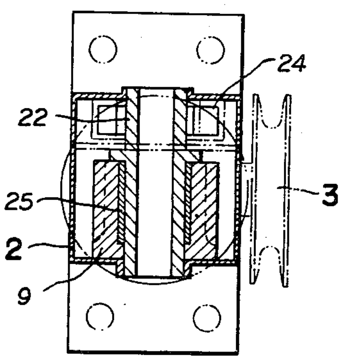
FIGURE 4 shows a cross section of the tilter-lifter device shown in FIGURE 2 at line 4—4.

A lower worm gear 9 is meshed with worm gear 5 and has attached in it the tilter rod 10 (FIGURES 2, 3 and 4). The lifter shaft 8 has threads 11 upon which are set stopper nuts 12, 13 and a limiter plate 14. A guide rod 15 passes through the limiter plate 14. The guide rod 15 is set in the housing 2 and is braced by a bracket 16 extending from the head box 1.

A lifter drum 17 is appropriately positioned along the threads 11. A lifter tape 18 is attached to the lifter drum so that it can be reeled in or out. Slat suspender tapes 19 are attached to the rail head 20. The rail head 20 in turn connected to the tilter rod 10 near the tilter lifter housing 2. The suspender tapes 19 support Venetian blind slats 21 (FIGURE 1).

Inside the housing and attached to a limiter rod 22 are wings 23 which are adapted to be limited in movement by fixed wings 24 in the housing 2. Interposed between the limited rod 22 and lower worm gear 9 is a ring spring 25 (FIGURES 3 and 4).

The tilter-lifter operates by actuation of the operating cord 4 which rotates the operating drum 3. A shaft 6 extending from the operating drum 3 has affixed to it a worm gear 5 which meshes with the upper worm gear 7 and lower worm gear 9. The lifter shaft 8 passing through, and moving with the upper worm gear 7 operates the lifter drum 17 and acts to raise or lower the Venetian blinds very much as in the past by taking in or letting out the lifter tape 18 which is attached to the drum 17. Limits of raising or lowering are set and maintained by pairs of stopper nuts 12, 13 which are tightened against each other in pairs at positions determining upper and lower limits of movement. The stopper nuts 12, 13 set the limits of movement by stopping the limiter plate 14 guided by the guide rod 15 as the limiter plate 14 travels along the threads 11 when the lifter shaft 8 is rotating.

The actuation of worm gear 5 simultaneously operates upper worm gear 7 and lower worm gear 9. The tilter rod 10 in limiter rod 22 which is attached to the head rail 20 moves with the movement of lower worm gear 9 and adjusts the position of the slats 21 by changing the position of the suspender tapes 19. The suspender tapes 19 are attached to the head rail 20. When the Venetian blind is set at a desired level short movements of the operating cord 4 are translated into movement which adjust the slats 21 to any desired position. There is some slight upward or downward movement of the lifter tape 18 or lifter drum 17 which is also actuated.

In lifting or lowering the Venetian blind the lower worm gear 9 with its associated mechanism rotates as the lifting or lowering commences until the rotation of limiter rod 22 is stopped by the action of wing 23 on the limiter rod 22 meeting fixed wings 24 in the housing 2. At this point the limiter rod 22 ceases its rotation which had been simultaneous with lower worm gear 9. The lower worm gear 9 and limiter rod 22 previously had rotated together unified by the pressure of the yieldable ring spring 25. At the point where wing 23 is stopped by fixed wing 24 the lower worm gear 9 continues its rotation independent of limiter rod 22 while a selected blind level is obtained by the winding of the lifter tape 18 on the lifter drum 17. At the desired height level of the blind a slight rotative adjustment of the limiter rod 22 in the direction opposite from that used for raising or lowering releases the stop action of the fixed wing 24 and sets the slat position to a desired position making a slight adjustment of the set Venetian blind level.

Figure 5:
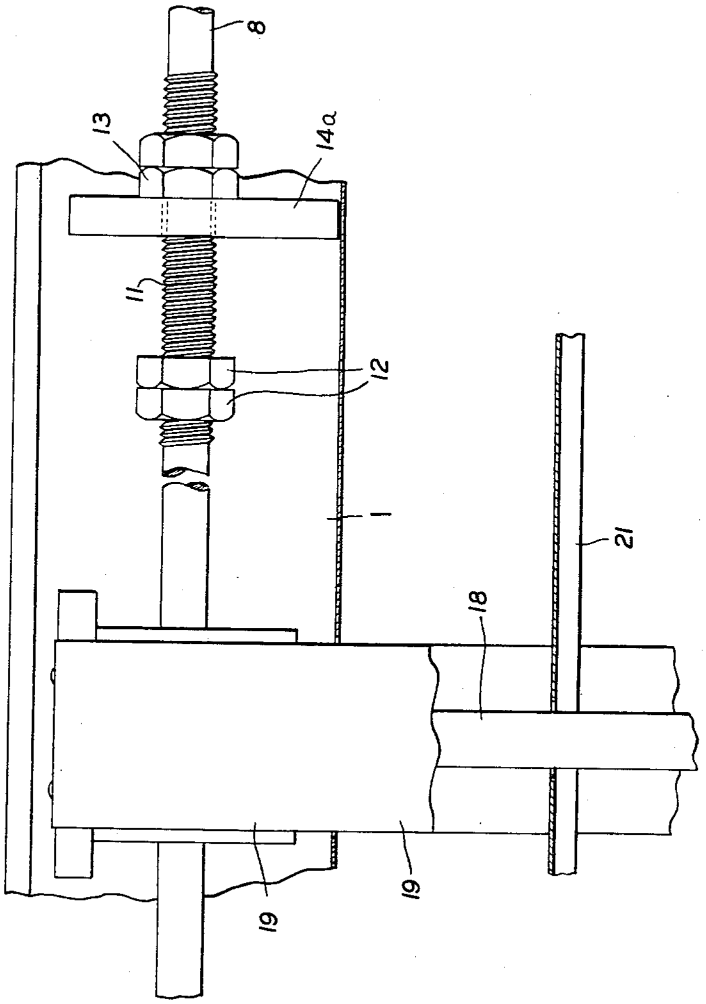
FIGURE 5 shows a front elevation of a Venetian blind head box with the front panel cut away showing an embodiment of the tilter-lifter device of the present invention and an alternate embodiment of the lift-lower stop mechanism.

A limiter plate 14*a* (FIGURE 5) is an alternate construction effectuating the purposes of the limiter plate 14 as it operates in conjunction with the guide rod 15.

The limiter plate 14*a* set on threads 11 between the the stopper nuts 12, 13 is constructed sufficiently large so that at least one of its outer surfaces rests flush with the head box 1. The surface of the head box 1 then serves as the guide and prevents the rotation of the limiter plate 14*a* upon movement of the lifter shaft 18 causing it to travel between the stopper nuts 12, 13 along the threads 11.

Figure 6:
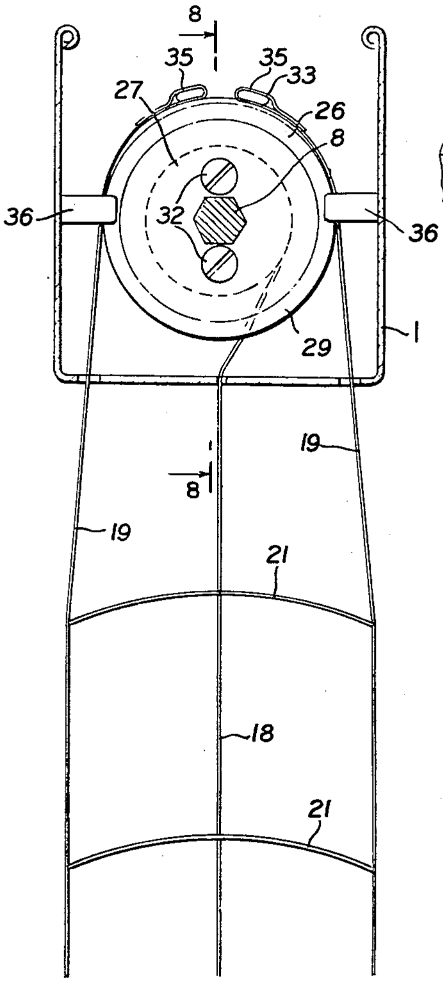
FIGURE 6 shows a side elevation of another embodiment of the tilter-lifter of the present invention in a head box.
Figure 7:
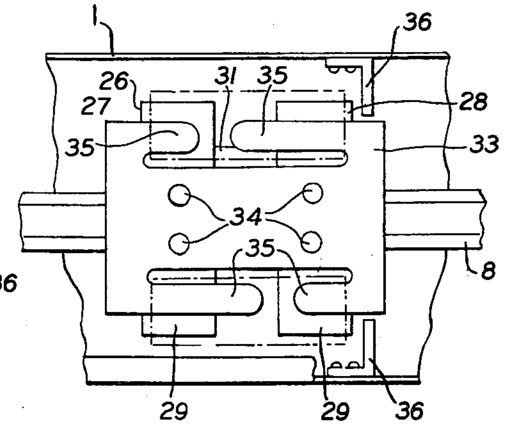
FIGURE 7 shows a plan view of the tilter-lifter shown in FIGURE 6.
Figure 8:
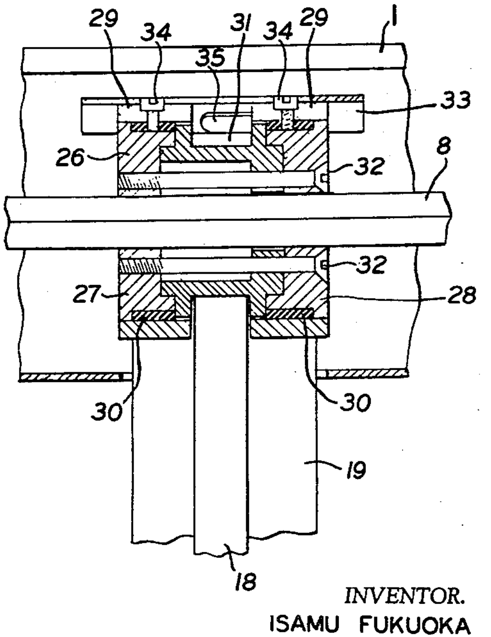
FIGURE 8 shows a cross section of the tilter-lifter shown in FIGURE 6 at line 8—8.

In FIGURES 6, 7 and 8 the embodiment of the tilter-lifter of the present invention operates from a lifter shaft 8 which is concentric to the mechanism. The head box 1 is inverted from the position shown in FIGURES 1 and 5. In this embodiment a unitary tilter-lifter drum 26 is provided with two tilter rims 27, 28 enclosed by cover tubes 29. The tilter rims 27, 28 are ring springs 30. A lifter drum 31 fits snugly between the tilter rims 27 and 28 and is joined to the rims 27, 28 as one unit by screws 32. The lifter tape 18 is attached to the lifter drum 31 by any convenient means. A clipping plate 33 is attached to the cover tubes 29 joining them by screws 34. The fingers 35 of the clipping plate 33 are adapted to receive the ends of the slat suspender tapes 19. The head box 1 is provided with stopper fins 36 which are in position to limit the movement of the clipping plate 33.

In this embodiment a slight rotation of the lifter shaft 8 adjusts the slats 21 by moving the suspender tapes 19 which are hung from the fingers 35 of the clipping plate 33 which is attached to the cover tubes 29. The clipping plate 33, cover tubes 29, tilter rims 27, 28 and lifter drum 31 move as a unit joined by the pressure of yieldable ring springs 30.

Lifting or lowering is effected by continued rotation of the shaft 8. The clipping plate 33 rotates as far as one of the stopper fins 36 where its movement is stopped while the lifter rims 27, 28 and lifter drum 31 on shaft 8 joined as a unit by screws 32 continue to rotate against the friction of the ring springs 30 taking up or letting out the lifter tape 18 and adjusting the Venetian blind to the desired level. At the desired level a contra rotation of shaft 8 adjusts the slats 21 to their desired position if they are not set to start at that moment.

In FIGURES 9, 10, 11 and 12 a further embodiment of the tilter-lifter of the present invention is shown. In these figures a unitary tilter-lifter drum 26 on a shaft 8 is provided with a lifter groove 37 and tilter rims 38, capping plates 39 fit snugly over the tilter rims 38 and bosses 40 which protrude from the unitary tilter-lifter drum 26. Grooves 41 in the bosses 40 are adapted to receive spring washers 42 which lock the capping plates 39 in position over the tilter rims 38. Plate springs 43 are interposed between the capping plates 39 and the tilter rims. A clipping plate 33 is attached to the capping plates 39 by screws 44. FIGURES 13 and 14 show details of the plate springs 43.

Rotation of the shaft 8 rotates the unitary tilter-lifter drum 26 with the slat suspender tapes 19 attached to the clipping plate 33 on the capping plates 39 and adjusts the Venetian blind slats to a desired position. Further rotation in any given direction causes the clipping plates 33 on capping plates 39 to be stopped in its movement either by coming in contact with the head box 1 or a stopper fin 36, not shown.

When the clipping plate 33 on the capping plates 39 is stopped and shaft 8 continues to rotate, the unitary tilter-lifter drum 26 overcomes the friction of the plate springs 43 which causes the clipping plate 33 and the unitary tilter-lifter drum 26 to rotate together, the plate spring 43 yields on continued rotation allowing the tilter-lifter drum 26 to rotate independently of the stopped clipping plate 33 and capping plates 39, lifting or lowering the lifter tape 18 on lifter grooves 37 depending on the direction of rotation. After lifting or lowering, the slats are adjusted to the desired position as in the other embodiment set forth herein.

Figure 16:
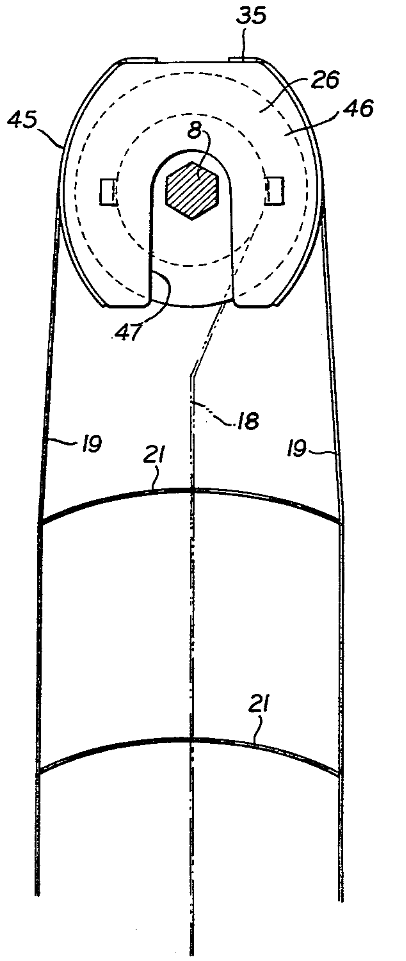
FIGURE 16 shows a side elevation of the tilter-lifter shown in FIGURE 15.
Figure 15:
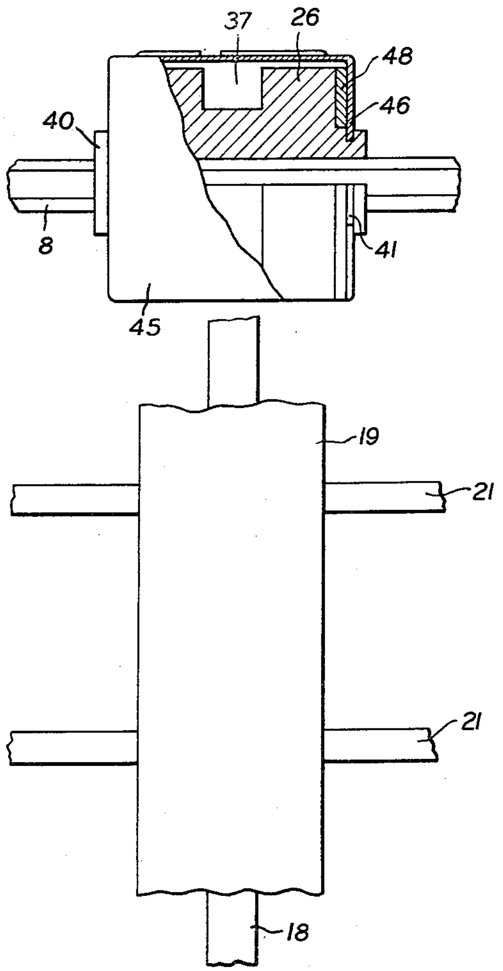
FIGURE 15 shows a front elevation of a further embodiment of the tilter-lifter of the present invention with the coverplate and lifter drum partially broken away.
Figure 17:
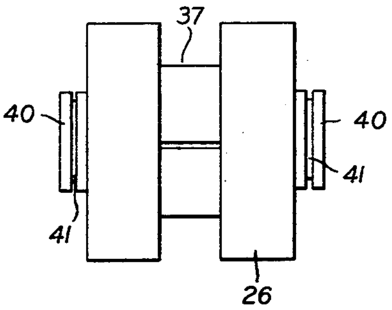
FIGURE 17 shows a front elevation of the lifter drum shown in FIGURE 15.
Figure 19:
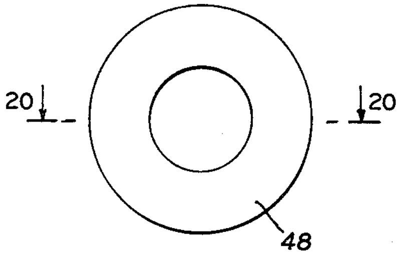
FIGURE 19 shows a front elevation of the spring shown in FIGURE 15.
Figure 18:
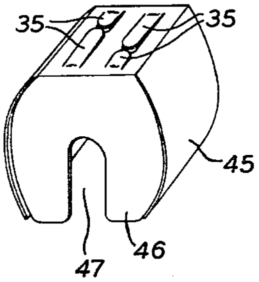
FIGURE 18 shows a side perspective of the coverplate shown in FIGURE 16.
Figure 20:
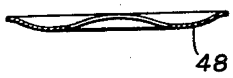
FIGURE 20 shows a cross section of the spring of FIGURE 19 at line 20—20.

FIGURES 15, 16 show a further embodiment of the tilter-lifter of the present invention. Details of components are shown in FIGURES 17, 18, 19 and 20. In this embodiment the shaft 8 passes through a unitary tilter-lifter drum 26 provided with protruding bosses 40, grooves 41 and a lifter groove 37. A cover plate 45 includes the function of the clipping plate 33 and is equipped with fingers 35 to receive slat suspender tapes 19. The cover plate 45 is equipped with side panels 46 which have channels 47 which are adapted to fit into the grooves 41 in the bosses 40. Two yieldable plate springs 48 of rounded construction are interposed between the unitary tilter-lifter drum 26 and the cover plate 45. Detailed view of the plate springs are shown in FIGURES 19 and 20.

The tilter-lifter device shown in FIGURES 15 and 16 operates on the same principle as the other embodiments of the tilter-lifter device of the present invention. The cover plate 45 on rotation upon shaft 8 is stopped by the head box 1 or stopper fins 36 after which the unitary tilter-lifter drum 26 on further rotation overcomes the friction of the yieldable plate spring 48 and continues to rotate free of the cover plate 45.

The terms and expressions which are employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A Venetian blind tilter-lifter device comprising a rotation source, a rotatable shaft actuated by said rotation source, rims fixed on said shaft, a tape winding drum joined to said rims, a slat lifting tape adapted to be wound on said drum, cover tubes enclosing said rims, spring rings frictionally coupling said cover tubes with said rims, a slat tilter plate attached to said cover tubes, slat suspender tapes attached to said slat tilter plate and stops for limiting the movement of said slat tilter plate.

2. A Venetian blind lifter-tilter device comprising a rotation source, a rotatable shaft actuated by said rotation source, a drum fixed on said shaft having a tape winding groove and tilter rims, a slat lifting tape adapted to be wound on said groove, capping plates snugly fitting over said tilter rims, plate springs interposed between said plates and tilter rims for frictionally coupling them, a slat tilter plate fixed on said capping plates, and means for limiting the movement of said slat tilter plate.

3. A Venetian blind tilter-lifter device comprising a rotation source, a rotatable shaft actuated by said rotation source, a drum having protruding bosses and a tape winding groove, a slat lifting tape adapted to be wound on said tape winding groove, a cover plate provided with side panels having channels adapted to fit into grooves in said bosses, plate springs interposed between said drum and cover plate for frictionally coupling the rotation of said cover plate.

References Cited in the file of this patent

UNITED STATES PATENTS

| | | |
|---|---|---|
| 664,451 | Alford | Dec. 25, 1900 |
| 1,877,440 | Adatte | Sept. 13, 1932 |
| 2,175,549 | Nardulli et al. | Oct. 10, 1939 |
| 2,229,221 | Pratt | Jan. 21, 1941 |
| 2,401,770 | Nardulli | June 11, 1946 |
| 2,604,939 | Griesser | July 29, 1952 |